June 7, 1960
D. W. McBRIDE
2,939,381
CAN PUNCHING AND COFFEE BREWING MECHANISM
Filed Jan. 22, 1957
2 Sheets-Sheet 1
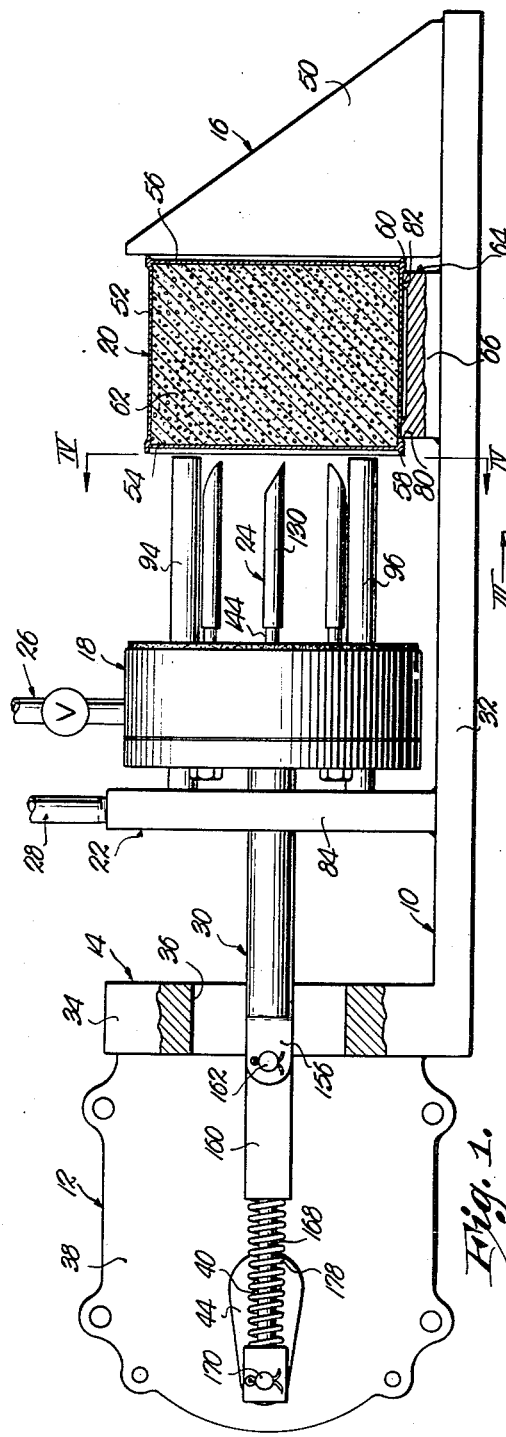
INVENTOR.
Donald W. McBride
BY
ATTORNEY.

June 7, 1960  D. W. McBRIDE  2,939,381
CAN PUNCHING AND COFFEE BREWING MECHANISM
Filed Jan. 22, 1957                                    2 Sheets-Sheet 2
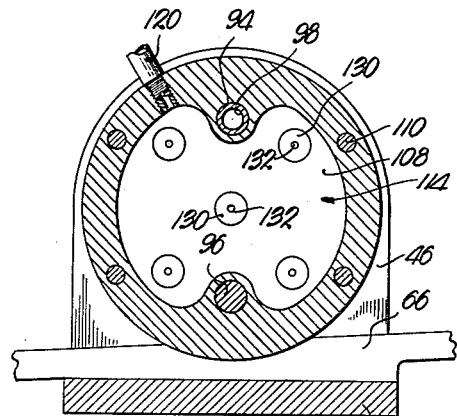
Fig. 3.
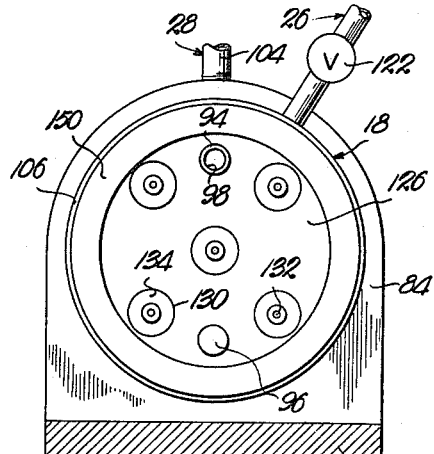
Fig. 4.
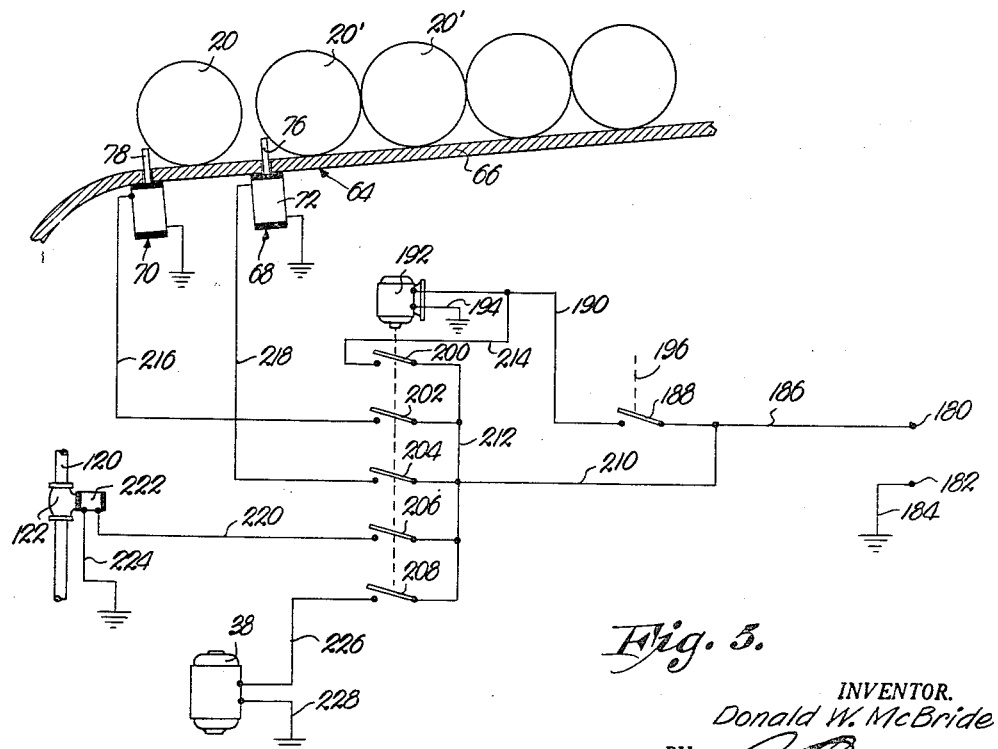
Fig. 5.
INVENTOR.
Donald W. McBride
BY
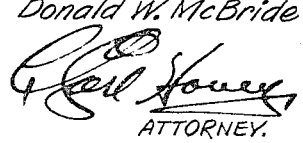
ATTORNEY.

United States Patent Office 2,939,381
Patented June 7, 1960

2,939,381
CAN PUNCHING AND COFFEE BREWING MECHANISM

Donald W. McBride, Independence, Mo., assignor to The Vendo Company, Kansas City, Mo., a corporation of Missouri Filed Jan. 22, 1957, Ser. No. 635,374

3 Claims. (Cl. 99—295)

This invention relates to the field of liquid beverage preparing equipment and, more particularly, to improved apparatus for the infusion brewing of coffee and analogous liquid beverages by the passage of heated water or the like under pressure into and out of a disposable, initially imperforate container which has been pierced by the operation of the apparatus with the water or the like infusing with a quantity of beverage forming material packaged within the container during its passage through the latter. The invention is especially, although not exclusively, adapted for use in the infusion brewing of coffee from fresh coffee grounds which are vacuum packed within conventional metallic cans.

The brewing of coffee or the like by infusion from coffee grounds which are maintained fresh until the moment of use by virtue of their packaging within a sealed metallic container obviously possesses many advantages over the alternative methods of brewing such beverages, including the production of a better end product and the elimination from dispensing or vending equipment of the necessity for filling permanent containers forming a part of the equipment with bulk charges of the beverage forming material. There is currently on the market one form of apparatus adapted for use in the infusion brewing of coffee by the passage of heated water through a metallic can containing coffee grounds, wherein the can is oppositely punched from both ends thereof by a pair of mechanisms both adapted to shift simultaneously toward and into engagement with a can, the water passing straight through the can from one pierced end wall thereof the other. Such apparatus shows promise of proving itself quite satisfactory insofar as the broad, basic considerations are concerned, however, it has been discovered that even more advantageous results can be obtained by the use of the improved structure contemplated by this invention, it being particularly notable that this invention can, and does, provide apparatus of surprisingly increased simplicity and positiveness and greatly decreased costs of manufacture and maintenance, as compared with the structures previously proposed for the same general purpose.

Accordingly, it is the primary object of this invention to provide improved can punching and infusion brewing apparatus in which the can is engaged and pierced from only one end thereof by means of a single shiftable assembly while it is being restrained by an opposed, stationary abutment assembly or member. It is to be observed that, in the structure of this invention, there is no necessity for synchronizing the single, movable assembly with a second and oppositely acting movable assembly, since all of the action can be performed by the single, shiftable assembly operating relative to a stationary abutment member.

It is another important object of this invention to provide such improved apparatus utilizing piercing means or elements which themselves provide fluid passages for the flow of an infusing liquid into one end of a can penetrated thereby and thence through the beverage forming material within the can and back out through the same end of the can.

Still other important objects of the invention, including a number of significant details of construction, will be made clear or become apparent as the following description of the invention progresses.

In the accompanying drawings:

Fig. 1 is a side elevational view of a form of improved infusion brewing apparatus made in accordance with this invention showing the shiftable assembly carrying the can piercing elements in its standby position;

Fig. 2 is a central cross sectional view of the apparatus illustrated in Fig. 1 showing the shiftable assembly in its operative position;

Fig. 3 is a cross sectional view on line III—III of Fig. 2;

Fig. 4 is a cross sectional view taken on line IV—IV of Fig. 1; and

Fig. 5 is a schematic diagram illustrating one form which control means associated with the infusion brewing apparatus might take.

Referring now to the drawings, and firstly to Figs. 1 and 2 particularly, the illustrated form of the improved apparatus contemplated by this invention broadly includes a base generally designated 10, a prime mover generally designated 12, means generally designated 14 for mounting the prime mover 12 on the base 10, a stationary abutment assembly generally designated 16 mounted on the base 10 in spaced relation to the prime mover 12, a shiftable assembly 18 between the prime mover 12 and the stationary assembly 16 and normally spaced from the latter sufficiently to permit insertion of an initially sealed, metallic can generally designated 20 therebetween, means generally designated 22 mounting the shiftable assembly 18 on base 10 for reciprocation toward and away from the stationary assembly 16, a number of can piercing elements generally designated 24 mounted on the shiftable assembly 18 in facing relationship to the stationary assembly 16, means generally designated 26 for effecting a fluid-tight coupling with parts of the shiftable assembly 18 and the elements 24 hereinafter to be more fully described, means generally designated 28 for effecting a fluid-tight coupling with parts of the assembly mounting means 22 hereinafter to be more fully described, and connecting means generally designated 30 operably coupling the prime mover 12 with the shiftable assembly 18 for reciprocating the latter toward and away from the stationary assembly 16.

The base 10 includes a horizontal bottom plate 32 having an upstanding flange 34 at one end thereof provided with an opening 36 therein. The prime mover 12 is secured to the flange 34 in any suitable manner (the fastening means not being illustrated in detail) with the prime mover 12 on the side of flange 34 remote from the opposite end of base 10. The prime mover 12 may be of various natures, but is preferably electrically operable. A preferred choice for the prime mover 12 would be an electric motor 38, as illustrated, having a rotatable drive shaft 40 forming a part thereof or operably coupled therewith either directly or through suitable gearing (not shown) depending upon the sizes and torque of the motor 38, although certain types of rotary solenoids could also be employed for the prime mover 12. Mounted upon the drive shaft 40 of motor 38 and keyed thereto as at 42 for rotation therewith, is a crank 44.

The stationary abutment assembly 16 at the end of base 10 opposite from flange 34 and motor 38 is illustrated as comprising an upright member 46 extending substantially perpendicularly from the bottom plate 32 of base 10 and secured to the latter in any suitable fashion as by welding to the plate 32 of a horizontal flange 48 integral with the member 46 and superimposed upon the plate 32. In order that member 46 may rigidly maintain its positioning relative to the base 10 integral side panels 50 may also be provided and suitably secured to the plate 32.

The type of container 20 with which the apparatus is to be used will preferably comprise a more or less conventional, metallic can of generally cylindrical configuration having a cylindrical side wall 52 closed at its ends by a pair of circular, initially imperforate end walls 54 and 56, with an annular flange or bead 58 and 60 respectively provided at the marginal edge of each of end walls 54 and 56 and extending oppositely in the general direction of the side wall 52. The can 20 will have packaged therein a quantity of fresh, beverage forming material 62, which will normally be some substantially dry, divided or granular material such as coffee grounds. In this connection, it should be noted that, although this invention is most largely described for purposes of illustration in terms of coffee grounds and the production of coffee, those skilled in the art will recognize the applicability of the apparatus and principles of the invention to the production of other infused products or beverages, for example, tea or the like.

At least certain of the advantageous results made possible by this invention may be obtained even with the insertion and removal of cans 20 to and from an infusion position between the assemblies 16 and 18 by hand. However, the apparatus of the invention is also particularly advantageous for use where some means for automatically feeding cans 20 to the infusion position and then discharging the same therefrom after the infusion operation is completed is provided. Such can feeding and discharging means may take any of a number of different forms, the precise nature of which constitutes no part of the present invention. Simply with a view to illustrating the manner in which the apparatus of this invention is adapted to cooperate with such can feeding and discharging means, there is illustrated in the drawings, more or less schematically, one possible form of structure which might be used for such purpose. The structure chosen for such exemplary purposes has been selected primarily because of its simplicity, so as to minimize the necessary description and explanation thereof which might tend to distract from the treatment herein of the portions of the contemplated apparatus whose details are more material to the present invention.

Thus, referring now also to Figs. 3 and 5, a can feeding and discharging means generally designated 64 may include an inclined ramp 66 having a portion mounted on the base plate 32 and disposed to pass between the assemblies 16 and 18 adjacent the assembly 16 and at a height for positioning a can 20 which has advanced thereon to the infusing position in proper disposition for the performance of the infusion operation. Such ramp 66 will accommodate, besides the particular can 20 shown in the infusion position, a plurality of other cans 20' on that portion of the ramp 66 extending upwardly of the infusion position. To complete the can feeding and discharging means 64 there may be provided means generally designated 68 for holding the cans 20' in a position on the ramp 66 above the infusion position and for releasing the same one at a time for movement by gravity to the infusion position where they will be temporarily stopped by means generally designated 70 adapted to release the same for discharge by gravity from the infusion position after the infusion operation has been completed. An example of electrically controllable means 70 and 68 would be a pair of solenoids 72 and 74 respectively operably coupled with shiftable stops 76 and 78 respectively associated with the ramp 66. Although the operation of such apparatus will likely be clear to those skilled in the art, it may be noted that, upon energization of the solenoid 74 stop 78 is shifted to a position permitting the can 20 in the infusion position to roll by gravity to a point of discharge, whereupon deenergization of solenoid 74 will reestablish the stop 78 in its operative position and solenoid 72 may be momentarily energized to shift the stop 76 while the next can 20' moves by gravity to the infusion position, with properly timed deenergization of the solenoid 72 then relocating the stop 76 to hold the remaining cans 20' away from the infusion position. As shown in Fig. 1, the ramp 66 may include slightly raised side rail portions 80 and 82 adapted to engage the side wall 52 of the cans 20 and 20' between the beads 58 and 60 thereof for maintaining the same in proper alignment as they are advanced to the infusion position.

Referring back now to Figs. 1–4, inclusive, the means 22 for reciprocably supporting the shiftable assembly 18 includes an upstanding, flat, plate-like piece 84 having a pair of bores 86 and 88 running therethrough in the direction of its thickness and a bore 90 having a threaded port 92 penetrating thereinto in the direction perpendicular to its thickness and communicating oppositely from the port 92 with the bore 86. A pair of guides 94 and 96 are secured to the piece 84 as by insertion within the bores 86 and 88 respectively and welding thereinto. Guides 94 and 96 are elongated and preferably cylindrical and extend from the piece 84 in parallelism with each other in a direction substantially perpendicular to the plane of the stationary, abutment member 46, the ends of guides 94 and 96 being spaced from member 46 sufficiently to permit reception and passage of a can 20 therebetween. The guide 94 is tubular having a passage 98 therein open at the end of guide 94 adjacent the member 46 and closed as at 100 at the opposite end thereof. A hole 102 in the guide 94 adjacent the end 100 thereof communicates with the bore 90 in piece 84. An outlet pipe 104 for coffee or other infused beverage is threadably coupled with the port 92.

The shiftable assembly 18 may be formed of a generally cylindrical metallic block 106 having a backing plate 108 fastened thereto by bolts or the like 110, there being a gasket 112 between the block 106 and its backing plate 108 to effect a sealed closing of a hollow cavity or chamber 114 formed in the back end, that is, the end proximate the piece 84 of block 106. Block 106 is provided with a lateral bore 116 penetrating thereinto and communicating with the internal chamber 114 of assembly 18. An inlet pipe 120 having a control valve 122 interposed therein is coupled in any suitable manner with the bore 116 of assembly 18, it being observed that pipe 120 should constitute at least in part a flexible tubing for accommodating the pipe 120 to the shifting of the assembly 18, as will hereinafter be more fully described. A number of threaded openings 124 leading from and perpendicular to the front face 126, that is, the face adjacent the member 46, of block 106, receive the threaded plug end 128 of a number of corresponding elongated, tubular piercing elements 130. Each element 130 has a longitudinal passage 132 therethrough communicating at one end thereof with the chamber 114 of assembly 18 and at the opposite end thereof with an obliquely angled end face of the element 130, which provides a piercing point 136 on each element 130. The faces 134 of the elements 130 preferably intersect the longitudinal axes of the latter at an acute angle. As will be apparent from Fig. 3, the chamber 114 is irregularly shaped to provide communication between the same and the bores 132 of the various piercing elements 130, which may be disposed as illustrated, or in any other suitable symmetrical pattern.

The assembly 18 is provided with a pair of parallel, elongated bores 138 and 140 extending through both the block 106 and the back plate 108 of the assembly 18 which are disposed and spaced for slidably receiving the guides 94 and 96 respectively. The assembly 18 is thus slidably mounted upon the guides 94 and 96 for reciprocation longitudinally of the latter, an O-ring sealing gasket 142 being provided within the assembly 18 for each of the rods 94 and 96 respectively.

It may now be further pointed out that each of the piercing elements 130 is provided with an inwardly extending annular groove 144 adjacent the plug end 128 thereof but spaced from the latter toward the face 134 sufficiently for disposition in through extending relationship to the end wall 54 of a can 20 in the infusion position when the assembly 18 has been advanced to its operative position as illustrated in Fig. 2. It will thus be apparent that the hot water inlet pipe 120 communicates with the interior of a can 20 in the infusion position and with the beverage forming material 62 therein, when the assembly is in its operative position, by a liquid path traceable from the pipe 120 through bore 116 into chamber 114 and thence through the passages 132 of the various piercing elements 130 and out through the faces 134 of the latter into communication with the interior of the can 20 at points adjacent the end wall 56 of the can 20. Similarly, a continued path for fluid flow and egress of the infused beverage is provided from the interior of can 20 through the grooves 144 in the various piercing elements 130 extending through openings 146 formed thereby in the end wall 54 of can 20 during movement of the assembly 18 from its standby position (as shown in Fig. 1), to its operative position (as shown in Fig. 2) into a hollow space or chamber 148 formed between the face 126 of block 106 of assembly 18 and the end wall 54 and bead 58 of can 20, a generally annular gasket 150 being provided upon the face 126 of block 106 for engagement with the bead 58 to seal the periphery of the chamber 148. As above noted, the bore 98 of guide 94 is open at the end thereof adjacent member 46 and therefore communicates with the space or chamber 148 for egress of the infused beverage from the chamber 148 through the bore 98 and hole 102 of guide 94 into the passage 90 of piece 84 and thence out the beverage outlet pipe 104, which it will be understood may conventionally lead to a storage tank or a dispensing spigot or the like.

In order to provide for the reciprocation of the assembly 18 between its standby and operative positions, the means 30 coupling the crank 44 of prime mover 12 with the shiftable assembly 18 may comprise, as illustrated, an elongated push rod 152 rigidly attached at its forwardmost end to the assembly 18 and extending rearwardly therefrom, that is, toward the flange 34, in parallelism with the guides 94 and 96. Push rod 152 is preferably slidably received within an opening 154 provided in the piece 84 and terminates on the side of piece 84 opposite the assembly 18 in a bifurcated extremity having a pair of spaced legs 156 (Fig. 1) and 158 (Fig. 2). A link 160 is pivotally connected with the push rod 58 by a pin 162 extending through the link 160 and the legs 156 and 158 of push rod 152. Link 160 has a bore 164 extending thereinto from the extremity thereof remote from the push rod 152, an intermediate stretch of such bore 164 opening into a slot 166 extending through the link 160. A connecting rod 168 is pivotally interconnected with the crank 44 by a pin 170 and has the extremity thereof remote from the crank 44 extending into and slidably received by the bore 164 of link 160. A limiting pin 172 passes through and is secured to the connecting rod 168 adjacent the extremity thereof remote from the crank 44, such limiting pin 172 being received within the slot 166 of link 160 for limiting the reciprocation of the connecting rod 168 relative to the link 160 to the longitudinal dimension of the slot 166 in which the pin 172 is disposed. The connecting rod 168 includes an enlarged portion 174 adjacent the crank 44 presenting a shoulder 176 on the connecting rod 168 facing the link 160. A coiled compression spring 178 is disposed upon the connecting rod 168 and bears oppositely against the shoulder 176 thereof and the adjacent extremity of the link 160. The reason for the provision of the spring 178 and the structure permitting limited reciprocation between the connecting rod 168 and the link 160 is to provide a yieldable bias on the link 160 and, therefore, the push rod 152 for maintaining the assembly 18 yieldably biased into a relationship with a cam 20 in the infusion position such that the gasket 150 maintains a sealed relationship with the bead 58 when the assembly 18 is in its operative position. As will be clear from the drawings, connecting rod 168, spring 78 and link 160 pass through the opening 36 in the flange 34.

Although control means having various details of construction could be provided for use with the can punching and infusion brewing apparatus contemplated by the invention, Fig. 5 illustrates a suitable form of control system for use in controlling the can advancing and releasing means 68 and 70 and the water valve 122. In Fig. 5 a pair of power terminals are designated 180 and 182, the latter being shown as grounded as at 184, although those skilled in the art will appreciate that separate conductors could be substituted for the ground connection. The other terminal 180 is connected by a conductor 186 through a normally open, single pole, single throw control switch 188 and a conductor 190 with one side of a timer actuating mechanism 192 such as an electric motor, the other side of mechanism 192 being grounded as at 194. As indicated by the dotted line 196, switch 188 will normally be operably coupled with some conventional means for controlling the operation of same such as apparatus for indicating the level of previously infused beverage remaining in a storage tank, a coin control mechanism or the like. The timer actuating mechanism 192 has operably coupled therewith a number of switches 200, 202, 204, 206 and 208 adapted to be opened and closed in predetermined sequence and timed relationship by the actuating mechanism 192 upon energization of the latter. The power terminal 180 is coupled by conductor 186, a conductor 210, and conductive means 212 with one side of each of the timer switches 200, et seq. The opposite side of timer switch 200 is coupled with the conductor 190 by a conductor 214 so as to be arranged in parallel with the control switch 188. The other side of switches 202 and 204 are respectively coupled with means 70 and 68 by conductors 216 and 218 respectively, although it will be understood that the article advancing and discharging function may be performed by a single, electrically responsive mechanism, in which case one switch would suffice in lieu of the switches 202 and 204 shown for illustrative purposes in connection with the simplified advancing and releasing means 68 and 70 chosen for illustration. The other side of the timer switch 206 is coupled by a conductor 220 with an electrically responsive solenoid 222 operably associated with the water valve 122 for actuating the latter, the solenoid 222 being oppositely grounded as at 224. The other side of timer switch 208 is coupled by a conductor 226 with one side of the assembly shifting motor 38, which is oppositely grounded as at 228.

Although the operation of the apparatus will likely now be apparent to those skilled in the art from the description of the structure provided, a brief summary of same is as follows. Assuming that an unpunctured can 20 has previously been advanced to the infusion position between assemblies 16 and 18 with the latter in its standby condition as illustrated in Fig. 1, even momentary closure of the control switch 188 by the operable coupling 196, with, for instance, liquid level indicating means will energize the timer mechanism or motor 192 for a period sufficient for the latter to close the timer switch 200, thereby completing a holding circuit for the continued energization of the timer motor 192 throughout one cycle, even though the switch 188 may open during such cycle. Continued operation of the timer motor 192 will then close timer switch 208 for a predetermined period necessary for the shifting motor 38 to rotate shaft 40 and crank 44 to move assembly 18 into the operative position illustrated in Fig. 2. During such shift of the assembly 18 from its standby to its operative position, the points 136 of the piercing elements 130 will puncture the end wall 54 of the can 20 disposed in the infusion position, such can being oppositely held by its abutment against the stationary member 46 of assembly 16. As the shifting of the assembly 18 continues, the face 134 of each of the elements 130 will further rupture the end wall 154 to present the openings 146 in the latter. As the assembly 18 moves into its full operative position, the faces 134 and the discharge ends of the water inlet passages 132 will be disposed within the can 20 adjacent the end wall 56 thereof, and the gasket 150 will be brought into sealing engagement with the bead 58 of the can 20 to close the chamber 148 around its periphery. As above noted, with the assembly 18 in its operative position, the spring 178 will be biasing the assembly 18 against the can 20.

As soon as the assembly 18 reaches its operative position, the timer switch 208 opens by virtue of its predetermined, timed relationship with the operation of the timer motor 192. Next, as the timer motor 192 continues to operate, it will close the water valve controlling switch 206 for a predetermined period of time during which the valve 122 will be opened to permit flow of hot water from the inlet pipe 120 through bore 116, chamber 114 of assembly 18 and passages 132 of the piercing elements 130 into the can 20 for discharge adjacent the end wall 56 of the can 20. Such water flows in infusing relationship through the coffee grounds or other beverage forming material 62 and thence out through the grooves 144 of the piercing elements into the chamber 148 between the assembly 18 and can 20. As the liquid flows into the chamber 148, it has been fully infused as a hot, freshly brewed beverage, it being noted that the dimensioning of the grooves 144 and the tendency of the coffee grounds or the like 62 to coagulate within the can 20 are such that, little, if any, of the material 62 is discharged through the grooves 144 into the chamber 148. The infused beverage continues to flow under the pressure exerted thereon by the introduction of hot water from the pipe 120 outwardly through the bore 98 and hole 102 of the guide 94 to the discharge pipe 104.

After a predetermined amount of water has thus been passed through the can 20, as determined by the predetermined time relationship of switch 206 to the operation of timer motor 192, timer switch 206 opens and the valve 122 closes to shut off such flow of water to the can 20.

Next, the switch 202 may close momentarily to switch the stop 78 until the can 20 which has just been used as an infusion chamber for brewing beverage from its own contents has been discharged from the ramp or other can supporting means 66. Then the switch 202 will open to restore stop 78 to a position for retaining the next can 20' to be advanced when the same reaches the infusion position between assemblies 16 and 18. Next, the switch 204 closes for a period sufficient to shift the stop 76 for the passage of the next stored can 20' to the infusion position (where it is retained by the stop 78), whereupon the switch 204 opens and stop 76 returns to a position for intercepting the next can 20' and holding the remainder of such cans 20'.

Finally, the holding switch 200 opens to restore the entire control system to its standby condition awaiting reactivation for a subsequent cycle by a further closing of the control switch 188.

It will now be apparent that this invention and the novel combination of structure contemplated thereby are ideally adapted for accomplishing all of the above-mentioned and other advantageous objects of the invention. It will be equally apparent to those skilled in the art, however, that a number of minor modifications and changes might be made in details of construction from the particular structure and components disclosed for illustrative purposes.

Accordingly, it is to be understood that the invention shall be deemed limited within the fair breadth of its objects and novelty only by the scope of the claims that follow.

Having thus described the invention, what is claimed as new and desired to be secured by Letters Patent is:

1. In apparatus for the infusion brewing of coffee and analogous liquid beverages by the passage of hot water under pressure into and out of a disposable, initially imperforate, generally cylindrical, metallic can having an annular marginal bead on one end thereof circumscribing the corresponding end wall thereof and a quantity of beverage forming material packaged therewithin, a base; a stationary member on the base engageable with the other end of the can; a shiftable assembly spaced from the member; means mounting the assembly on the base for reciprocation between a standby position in which the assembly is disposed relative to the member for receiving the can therebetween and an operative position in which the assembly engages the bead of the can and shifts the can into engagement at its said other end with the member; means operably coupled with the assembly for shifting the latter between its standby and operative positions; means on the assembly for effecting a fluid-tight seal between the bead of the can and the assembly when the latter is in its operative position with a can between the member and the assembly, for presenting a closed chamber between the assembly and said one end wall of the can; fluid communication path presenting means extending through the assembly into communication with the chamber when the assembly is in its operative position; means for making a fluid-tight connection of the extremity of said fluid path presenting means remote from said chamber with a source of hot water; a number of can piercing elements mounted on the assembly only and disposed for piercing and extending through said one end wall only of the can as the assembly is shifted from its standby to its operative position with a can between the assembly and the member; first passage presenting means in at least one element extending throughout a stretch of the latter having its extremities disposed for being on opposite sides of said one end wall of a can between the member and the assembly when the latter is in said operative position for providing a path of fluid communication between said chamber and the interior of a can having said element extending thereinto; second passage presenting means extending through at least one element, isolated from said first passage, having an extremity disposed for being within a can between the member and the assembly when the latter is in said operative position, and having an opposite extremity always external to the can and isolated from said chamber; and means for making a fluid-tight connection of said opposite extremity of the second passage with means for carrying away brewed beverage.

2. In apparatus as set forth in claim 1, wherein said first and second passage presenting means are both provided in a single element.

3. In apparatus as set forth in claim 1, wherein said assembly is reciprocably mounted on an elongated, stationary guide, said guide being disposed to engage said container as the assembly is shifted into said standby relationship relative to the member for removing the container from the piercing elements on the assembly.

References Cited in the file of this patent
UNITED STATES PATENTS

| | | |
|---|---|---|
| 604,596 | Berger | May 24, 1898 |
| 1,995,098 | Healy | Mar. 19, 1935 |
| 2,306,550 | Mailen | Dec. 29, 1942 |
| 2,419,845 | Merrick | Apr. 29, 1947 |
| 2,582,660 | Thomas | Jan. 15, 1952 |
| 2,609,982 | Johnson | Sept. 9, 1952 |
| 2,618,407 | Thorn | Nov. 18, 1952 |
| 2,710,115 | Chandler | June 7, 1955 |
| 2,776,076 | Nunn | Jan. 1, 1957 |
| 2,778,739 | Rodth | Jan. 22, 1957 |